United States Patent
Quennehen et al.

(10) Patent No.: US 12,158,079 B2
(45) Date of Patent: Dec. 3, 2024

(54) TURBINE RING ASSEMBLY MOUNTED ON A CROSS-MEMBER

(71) Applicant: SAFRAN AIRCRAFT ENGINES, Paris (FR)

(72) Inventors: Lucien Henri Jacques Quennehen, Moissy-Cramayel (FR); Antoine Claude Michel Etienne Danis, Moissy-Cramayel (FR); Clément Jean Pierre Duffau, Moissy-Cramayel (FR); Clément Jarrossay, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 36 days.

(21) Appl. No.: 17/604,904

(22) PCT Filed: Apr. 3, 2020

(86) PCT No.: PCT/EP2020/059592
§ 371 (c)(1),
(2) Date: Oct. 19, 2021

(87) PCT Pub. No.: WO2020/224891
PCT Pub. Date: Nov. 12, 2020

(65) Prior Publication Data
US 2022/0195894 A1 Jun. 23, 2022

(30) Foreign Application Priority Data
May 3, 2019 (FR) ...................... 1904663

(51) Int. Cl.
*F01D 25/28* (2006.01)
*F01D 25/12* (2006.01)
*F01D 25/24* (2006.01)

(52) U.S. Cl.
CPC ............. *F01D 25/28* (2013.01); *F01D 25/12* (2013.01); *F01D 25/246* (2013.01)

(58) Field of Classification Search
CPC ........ F01D 25/246; F01D 11/08; F01D 25/28; F05D 2240/11; F05D 2260/30–39; F05D 2300/6033
See application file for complete search history.

(56) References Cited

U.S. PATENT DOCUMENTS 10,907,501 B2 * 2/2021 Filippi .................. F01D 25/005
2012/0027572 A1 2/2012 Denece et al.
(Continued)

FOREIGN PATENT DOCUMENTS

EP 0 516 322 A1 12/1992
FR 3 055 147 A1 2/2018
(Continued)

OTHER PUBLICATIONS

International Search Report as issued in International Patent Application No. PCT/EP2020/059592, dated Aug. 20, 2020.

*Primary Examiner* — Christopher Verdier
*Assistant Examiner* — Arthur Paul Golik
(74) *Attorney, Agent, or Firm* — Pillsbury Winthrop Shaw Pittman LLP

(57) ABSTRACT

A turbine ring assembly extending about an axis, includes a plurality of ring sectors made of ceramic matrix composite material forming a turbine ring and a ring support structure held by a turbine casing, each ring sector including a base from which an upstream lug and a downstream lug spaced axially from each other extend radially outwardly, the ring support structure including a spacer having a clamp against which the downstream lug of the ring sectors is held, a first upstream flange against which the upstream lug of the ring sectors is held, and upstream of the first upstream flange, a (Continued)

second upstream flange for absorbing forces against which the first upstream flange is held.

9 Claims, 2 Drawing Sheets

(56) References Cited

U.S. PATENT DOCUMENTS

| | | | | |
|---|---|---|---|---|
| 2018/0087401 A1* | 3/2018 | Quennehen | ............ | F01D 11/08 |
| 2019/0211704 A1* | 7/2019 | Whittle | .................. | F01D 11/08 |
| 2020/0072069 A1* | 3/2020 | Clark | ................ | C04B 35/62868 |
| 2020/0200034 A1* | 6/2020 | Filippi | .................. | F01D 11/122 |

FOREIGN PATENT DOCUMENTS

| | | | | |
|---|---|---|---|---|
| JP | 2017-524089 A | 8/2017 | | |
| WO | WO-2015191186 A1 * | 12/2015 | ............. | F01D 11/12 |
| WO | WO 2018/172653 A1 | 9/2018 | | |

\* cited by examiner

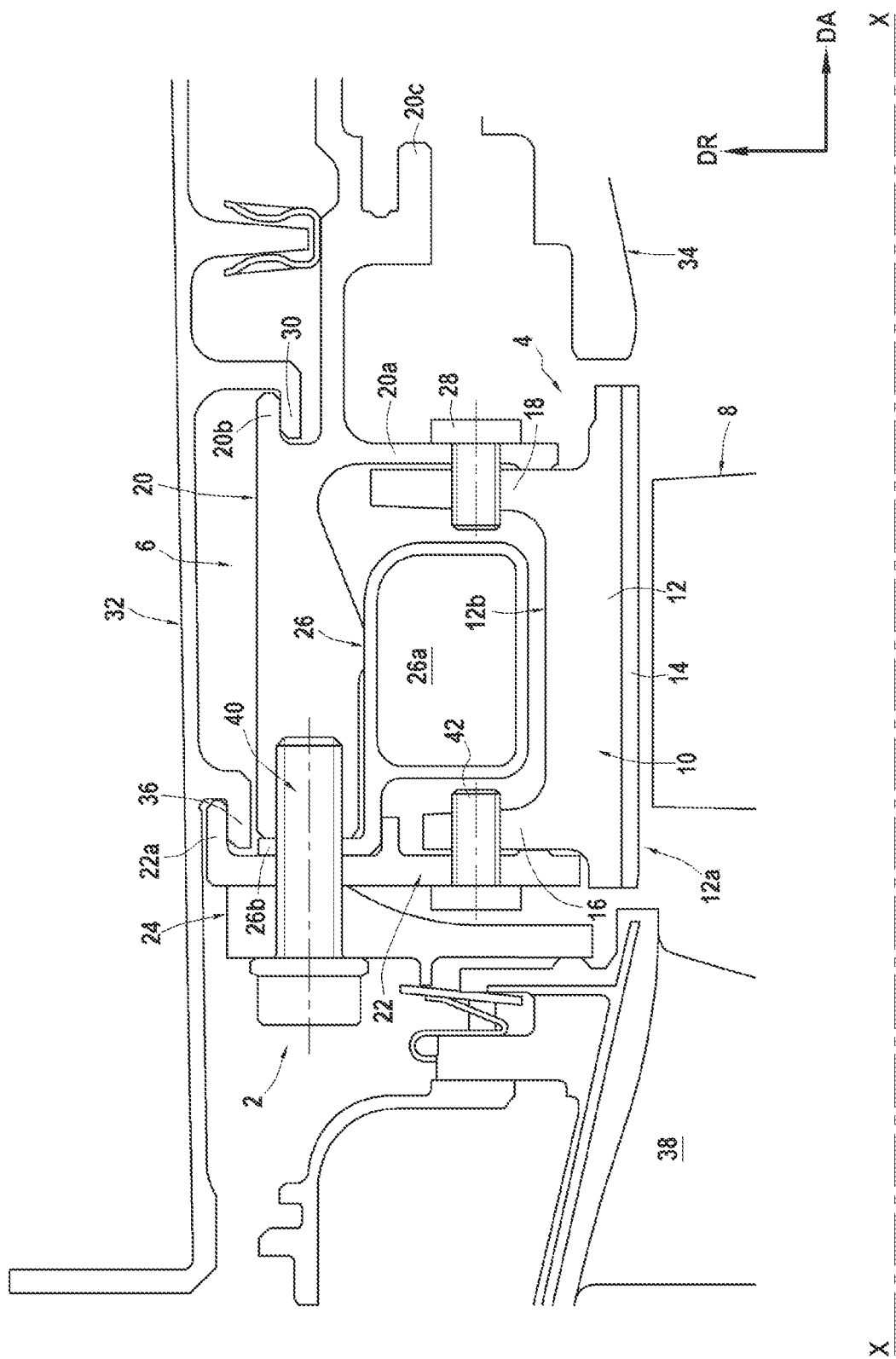
[Fig. 1]

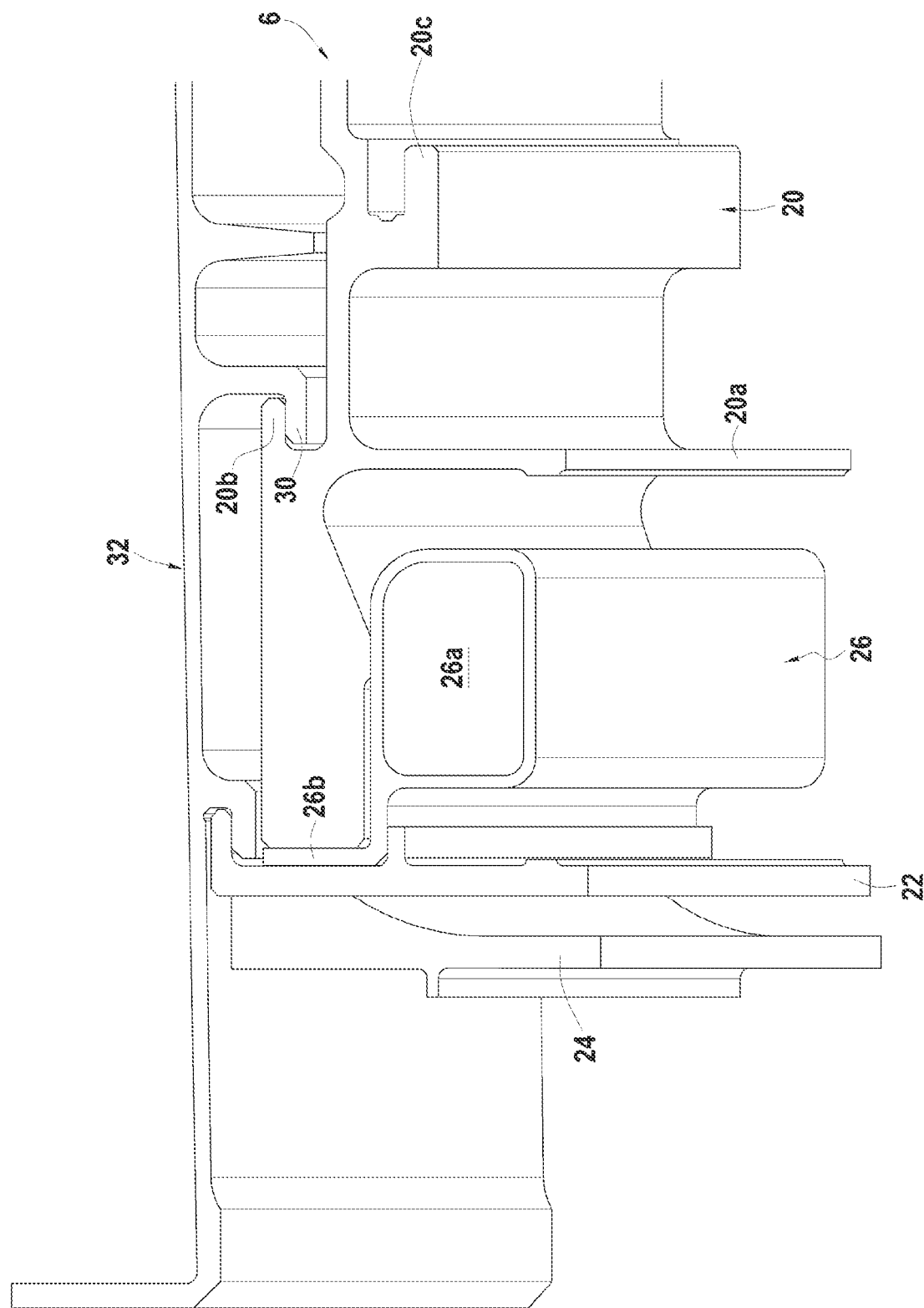
[Fig. 2]

TURBINE RING ASSEMBLY MOUNTED ON A CROSS-MEMBER

CROSS-REFERENCE TO RELATED APPLICATIONS

This application is the U.S. National Stage of PCT/EP2020/059592, filed Apr. 3, 2020, which in turn claims priority to French patent application number 1904663 filed May 3, 2019. The content of these applications are incorporated herein by reference in their entireties.

TECHNICAL FIELD

The invention relates to a turbine ring assembly for a turbomachine in which the assembly comprises a plurality of angular ring sectors placed end to end to form a turbine ring made of ceramic matrix composite material.

One field of application of the invention is in particular that of aeronautical gas turbine engines.

PRIOR ART

The ceramic matrix composite materials, or CMC, are known to retain their mechanical properties at high temperatures, which makes them able to constitute elements of a hot structure.

In aeronautical gas turbine engines, the improvement in the efficiency and the reduction of some polluting emissions lead to seeking operation at ever higher temperatures. In the case of entirely metallic turbine ring assemblies, it is necessary to cool all the elements of the assembly and particularly the turbine ring which is subjected to very hot flows, typically higher than the temperature tolerable by the metal material. This cooling has a significant impact on the performance of the engine since the cooling flow used is taken from the main flow of the engine. In addition, the use of metal for the turbine ring limits the possibilities of increasing the temperature at the turbine, which would however allow improving the performances of the aeronautical engines.

Furthermore, a metal turbine ring assembly deforms under the effect of heat flows, which changes the clearances at the flowpath and, consequently, the performances of the turbine.

This is why the use of CMC for different hot portions of the engines has already been envisaged, especially as the CMC have the complementary advantage of a lower density than that of traditionally used refractory metals.

Thus, the production of turbine ring sectors in a single piece from CMC is in particular described in document US 2012/0027572. The ring sectors include an annular base whose inner face defines the inner face of the turbine ring and an outer face from which two lugs whose ends are held between the two clamps of a metal ring support structure radially extend.

The use of CMC ring sectors thus allows significantly reducing the ventilation required to cool the turbine ring. However, the CMC having a different mechanical behavior from a metal material, its integration as well as the way of positioning it within the turbine had to be rethought. Indeed, the CMC does not withstand shrink-fittings (usually used for metal rings) and its thermal expansion is lower than that of a metal material.

In addition, the use of CMC ring sectors increases the number of parts necessary for its integration on the turbine casing, which increases the cost and weight of the assembly and requires complex mounting operations (shrink-fitting of sleeves, mounting of bushings, etc.).

DISCLOSURE OF THE INVENTION

The present invention therefore aims at proposing a turbine ring assembly which does not have the aforementioned drawbacks.

This aim is achieved by means of a turbine ring assembly extending about an axis, comprising a plurality of ring sectors made of ceramic matrix composite material forming a turbine ring and a ring support structure held by a turbine casing, each ring sector comprising a base from which an upstream lug and a downstream lug spaced axially from each other extend radially outwardly, the ring support structure comprising a spacer having a clamp against which the downstream lug of the ring sectors is held, a first upstream flange against which the upstream lug of the ring sectors is held and, upstream of the first upstream flange, a second upstream flange for absorbing forces against which the first upstream flange is held.

The turbine ring assembly according to the invention is remarkable in particular in that the CMC ring is held directly on the turbine casing by means of a ring support structure without resorting to a ring support casing. Particularly, compared to the prior art, the assembly according to the invention is devoid of ring support casing and the radial slugs that allow holding the ring support structure on this casing are eliminated.

In addition, the ring support structure is made of several parts that are separate and independent from each other, which allows a mounting of this structure per angular sectors and no longer a crown mounting. The mounting of the turbine ring assembly is simplified and requires no tools. Furthermore, the manufacturing tolerances are less severe, the spacers making it possible to compensate for the gaps between the ring sectors, which a 360° flange cannot do. In addition, the elimination of radial slugs reduces the operations of machining the parts of the ring support structure. This results in a saving of parts and therefore a reduction of the weight and cost of the assembly.

Advantageously, the ring support structure further comprises an air diffuser intended to diffuse cooling air on an outer face of the base of the ring sectors. In this case, the air diffuser of the ring support structure may comprise a clamp held between the spacer and the first upstream flange.

Preferably, the ring support structure further comprises a plurality of fastening means screwed into the spacer and crossing from upstream to downstream in order to fasten together the first upstream flange, the second upstream flange and the clamp of the air diffuser.

Also advantageously, the assembly further comprises upstream axial slugs intended to hold the first upstream flange of the ring support structure against the upstream lug of the ring sectors. Likewise, the assembly preferably further comprises downstream axial slugs intended to hold the clamp of the spacer of the ring support structure against the downstream lug of the ring sectors.

The spacer of the ring support structure may comprise an upstream hook for the mounting of said ring support structure on the turbine casing. Likewise, the first upstream flange of the ring support structure may comprise a hook for the mounting of said ring support structure on the turbine casing.

In addition, the spacer of the ring support structure may further comprise a downstream hook for holding a low-pressure turbine nozzle positioned downstream of the turbine assembly.

The invention also relates to a turbomachine comprising an assembly as defined above.

BRIEF DESCRIPTION OF THE DRAWINGS

FIG. 1 is a longitudinal sectional view of a turbine ring assembly according to the invention.

FIG. 2 representsa schematic and perspective view of the turbine assembly of FIG. 1.

DESCRIPTION OF THE EMBODIMENTS

FIG. 1 represents, in longitudinal section, a turbine ring assembly 2 according to the invention.

This assembly 2 comprises in particular a turbine ring 4 made of ceramic matrix composite material (CMC) centered on a longitudinal axis XX and a metal ring support structure 6. The turbine ring 4 surrounds a set of turbine blades 8.

Furthermore, the turbine ring 4 is formed of a plurality of angular ring sectors 10 which are placed end to end circumferentially to form a ring. In FIG. 1, the arrow DA indicates the axial direction of the turbine ring while the arrow DR indicates the radial direction of the turbine ring.

Each angular ring sector 10 has a section substantially in the form of an inverted Pi (or π) with a base 12 provided with an inner face 12a which defines an angular portion of the inner face of the turbine ring and which is typically provided with an abradable coating layer 14 also acting as a thermal and environmental barrier.

Two lugs—namely an upstream lug 16 and a downstream lug 18—extend radially from the outer face 12b of the base 12 opposite to the inner face 12a. These lugs 16, 18 extend over the entire width of the ring sector 10 (in the circumferential direction).

According to the invention, the ring support structure 6 is produced by assembling a plurality of parts that are separate (i.e. independent) from each other.

As more specifically represented in FIG. 2, these parts comprise in particular a spacer 20, a first upstream flange 22, a second upstream flange 24 for absorbing forces, and an air diffuser 26.

The spacer 20 comprises a clamp 20a against which the downstream lug 18 of the ring sectors 10 is held by means of a plurality of downstream axial slugs 28 evenly distributed about the longitudinal axis XX of the ring.

The spacer 20 also comprises an upstream hook 20b which is intended to engage a downstream hook 30 of a turbine casing 32 in order to allow the mounting of the ring support structure directly on the turbine casing.

The spacer 20 also comprises a downstream hook 20c which is intended to engage a corresponding hook (not represented in the figures) of a low-pressure turbine nozzle 34 located downstream of the turbine ring assembly 2 in order to hold it.

It will be noted that the spacer 20 can be a part of revolution (that is to say of 360°) or be produced by an assembly of a plurality of spacer sectors placed end to end.

The upstream lug 16 of the ring sectors 10 is held against the first upstream flange 22.

The first upstream flange 22 also comprises a hook 22a which is intended to engage an upstream hook 36 of the turbine casing 32 in order to allow the mounting of the ring support structure directly on the turbine casing.

The first upstream flange 22 can be a part of revolution (that is to say of 360°) or be produced by an assembly of two half-flanges of 180° each.

The first upstream flange 22 is held upstream against a second upstream flange 24 for absorbing forces. The latter is intended to absorb the forces of a high-pressure turbine nozzle 38 which is positioned upstream of the turbine ring assembly.

This front flange 24 can be a part of revolution (that is to say of 360°) or be a sectored part.

Finally, the air diffuser 26 is intended to diffuse cooling air on the outer face 12b of the base 12 of the ring sectors. To this end, it comprises a cavity 26a positioned around the base 12 of the ring sectors, supplied with cooling air taken from a stage of the compressor of the turbomachine and opening out towards the outer face of the base of the ring sectors by means of a multi-perforation of its walls (not represented in the figures).

The air diffuser 26 also comprises a clamp 26b held between the spacer 20 and the first upstream flange 22.

The ring support structure 6 further comprises a plurality of fastening means 40 (for example bolted connections) which are screwed into the spacer 20 and cross from upstream to downstream in order to fasten together the first upstream flange 22 the second upstream flange 24 for absorbing forces and the clamp 26b of the air diffuser 26.

The turbine ring assembly 2 further comprises upstream axial slugs 42 which are intended to hold the first upstream flange 22 of the ring support structure against the upstream lug 16 of the ring sectors 10. These upstream slugs 42 are evenly distributed about the longitudinal axis XX of the ring.

In this way, the upstream and downstream lugs 16, 18 of the ring sectors 10 are held between the first upstream flange 22 and the clamp 20a of the spacer 20 of the ring support structure 6.

It will be noted that the control of the clearance at the top of the turbine blades 8 can be achieved by adjusting the thicknesses of the turbine casing 32 or by providing the latter with control bosses (not represented in the figures).

The invention claimed is:

1. A turbine ring assembly extending about an axis, comprising a plurality of ring sectors made of ceramic matrix composite material forming a turbine ring and a ring support structure held by a turbine casing, each ring sector comprising a base from which an upstream lug and a downstream lug spaced axially from each other extend radially outwardly, the downstream lug extending radially outwardly farther than the upstream lug, the ring support structure comprising a spacer having a clamp against which the downstream lug of each ring sector is held, a first upstream flange against which the upstream lug of each ring sector is held and, upstream of the first upstream flange, a second upstream flange for absorbing forces against which the first upstream flange is held, wherein the ring support structure further comprises an air diffuser configured to diffuse cooling air on an outer face of the base of each ring sector, wherein the air diffuser of the ring support structure comprises a clamp that is axially held between the spacer and the first upstream flange, wherein an upper portion of the air diffuser is arranged between and in contact with both the spacer and a shoulder of the first upstream flange such that the air diffuser is radially held by the spacer and by said shoulder, and wherein the ring support structure further comprises a plurality of fasteners screwed into the spacer and crossing from upstream to downstream in order to fasten together the first upstream flange, the second upstream flange and the clamp of the air diffuser.

2. The turbine ring assembly according to claim 1, further comprising upstream axial slugs configured to hold the first upstream flange of the ring support structure against the upstream lug of each ring sector.

3. The turbine ring assembly according to claim 1, further comprising downstream axial slugs configured to hold the clamp of the spacer of the ring support structure against the downstream lug of each ring sector.

4. The turbine ring assembly according to claim 1, wherein the spacer of the ring support structure comprises an upstream hook for the mounting of said ring support structure on the turbine casing.

5. The turbine ring assembly according to claim 4, wherein, along said axis, the upstream hook is positioned downstream the downstream lug.

6. The turbine ring assembly according to claim 1, wherein the first upstream flange of the ring support structure comprises a hook for the mounting of said ring support structure on the turbine casing.

7. The turbine ring assembly according to claim 1, wherein the spacer of the ring support structure further comprises a downstream hook for holding a low-pressure turbine nozzle positioned downstream of the turbine assembly.

8. A turbomachine comprising the turbine ring assembly according to claim 1.

9. The turbine ring assembly according to claim 1, wherein the clamp of the air diffuser extends radially outwardly from the upper portion of the air diffuser.

* * * * *